No. 817,599. PATENTED APR. 10, 1906.
J. B. S. P. TWAHA.
HORSE RELEASER.
APPLICATION FILED JULY 6, 1905.
2 SHEETS—SHEET 1.
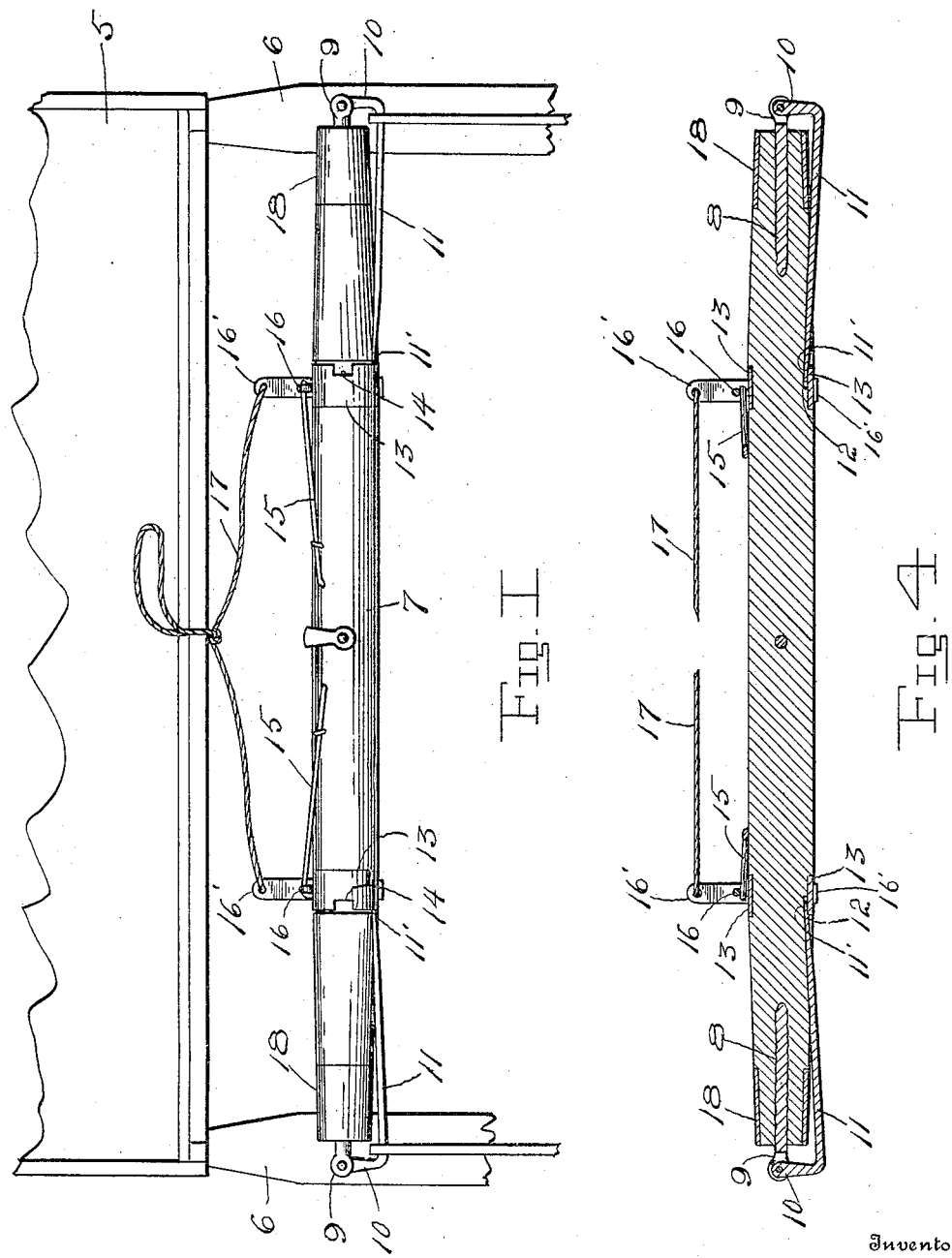
Witnesses
J. C. Simpson
E. M. Dolford
Inventor
Jaim B. S. P. Twaha
By Chandler & Chandler
Attorneys

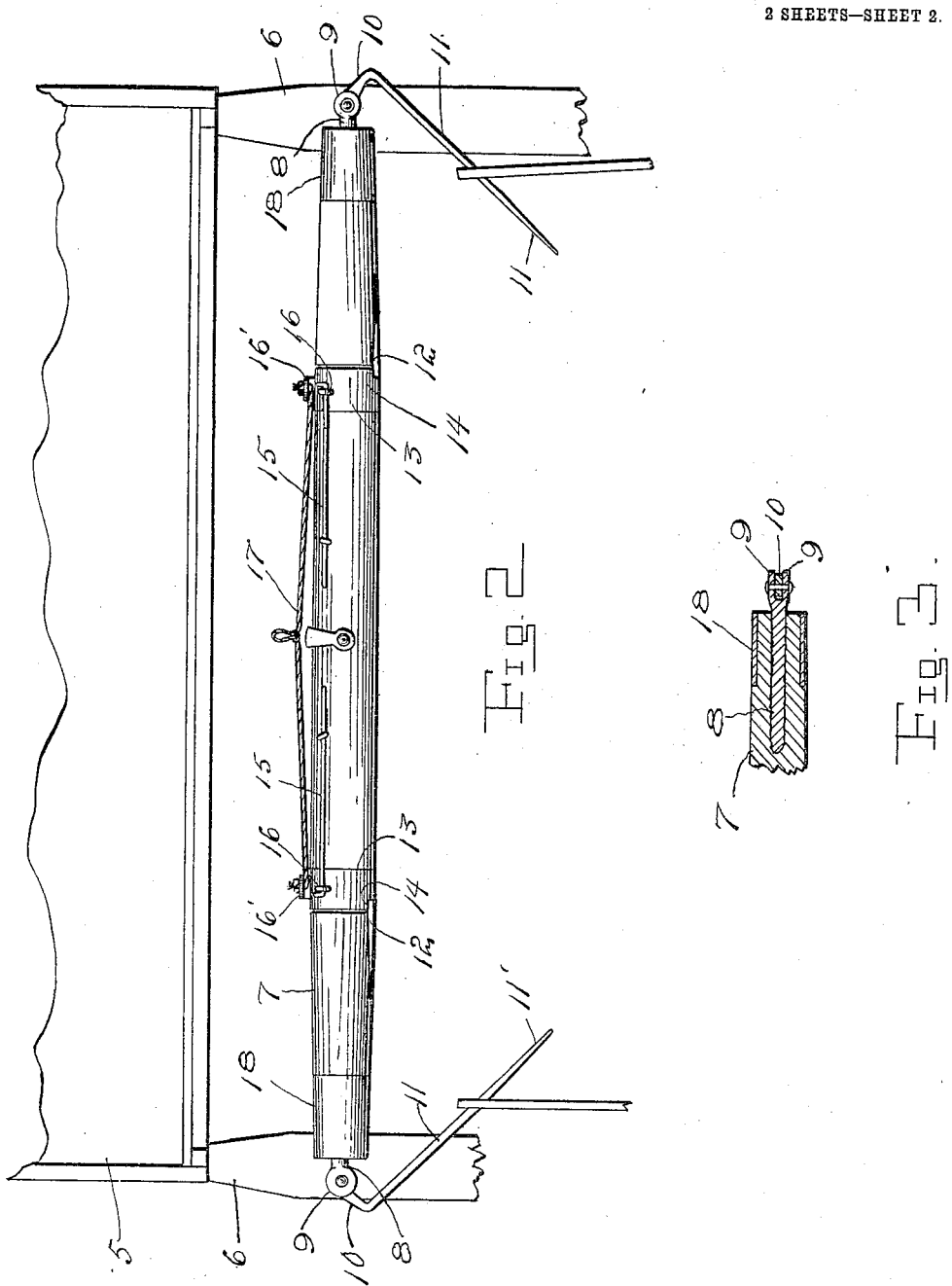

UNITED STATES PATENT OFFICE.

JAIM B. S. P. TWAHA, OF SPOKANE, WASHINGTON.

HORSE-RELEASER.

No. 817,599.     Specification of Letters Patent.     Patented April 10, 1906.

Application filed July 6, 1905. Serial No. 268,431.

*To all whom it may concern:*

Be it known that I, JAIM B. S. P. TWAHA, a citizen of the United States, residing at Spokane, in the county of Spokane, State of Washington, have invented certain new and useful Improvements in Horse-Releasers; and I do hereby declare the following to be a full, clear, and exact description of the invention, such as will enable others skilled in the art to which it appertains to make and use the same.

This invention relates to vehicles, and more particularly to means for releasing horses therefrom, and has for its object to provide a horse-releaser which while being efficient in operation will be extremely simple in construction and may be manufactured at a low figure.

Other objects and advantages will be apparent from the following specification, which describes an embodiment of the present invention.

In the drawings forming a portion of this specification, and on which like numerals of reference indicate similar parts in the several views, Figure 1 is a top plan view of the forward portion of a wagon provided with the present invention. Fig. 2 is a view similar to Fig. 1, showing the arms released. Fig. 3 is a longitudinal sectional view through one end portion of the swingletree. Fig. 4 is a horizontal longitudinal section of the swingletree with the parts in position shown in Fig. 1.

Referring now to the drawings, there is shown a wagon 5, having shafts 6 and having a pivoted swingletree 7. Engaged in the ends of the swingletree there are roughened rods 8, having horizontally-extending spaced ears 9 at their outer ends, between which are pivoted the angular end portions 10 of arms 11, which extend normally longitudinally of the swingletree and have their free ends 11' engaged in longitudinal recesses 12, formed in the forward face of the swingletree, the angular portions 10 of the arms extending normally parallel to the ends of the swingletree. The arms are thus movable pivotally between the ears 9 toward and away from the forward portion of the swingletree, and they are held normally with their end portions 11' in the recesses 12 by means of collars 13, which are revolubly mounted upon the swingletree and which extend over the ends of the arms. The collars 13 have notches 14 in their outer edges, and the collars are revoluble to register these notches with the recesses 12 to permit of movement of the arms 11 into and out of the recesses, the collars being held yieldably with their notches 14 out of such registration by means of spring-rods 15, secured at their inner ends to the swingletree and having their outer ends engaged in eyes 16, carried by the collars.

When the collars are in their normal positions, the notches 14 lie above the arms 11, so that downward movement of the notched portions of the collars is necessary to register notches with the recesses, and extending rearwardly from the under portions of the collars and at a tangent thereto there are fingers 16, having cables 17 attached to their rearward ends. These cables extend to a point within reach of the driver of the vehicle and may be pulled to release the arms 11, these arms forming trace-hooks, as will be readily understood. Ferrules 18 are engaged with the ends of the whiffletree to hold the rods 8 against disengagement therefrom.

What is claimed is—

1. A horse-releaser comprising a swingletree, trace-engaging arms pivoted at one end to the swingletree and lying normally with their other ends against the swingletree, collars revolubly engaged with the swingletree and extending over the ends of the arms to hold the arms against pivotal movement, said collars having notches therein and being movable to bring their notches into position for the passage of the ends of the arms therethrough, means for holding the collars yieldably with their notches out of such position, fingers carried by the collars and devices connected with the fingers and adapted for operation to move the collars against the action of the holding means.

2. A horse-releaser comprising a swingletree, rods engaged in the ends of the swingletree and having spaced ears at their outer ends, trace-engaging arms having angular end portions pivoted between the spaced ears, said arms lying normally with their opposite ends against the swingletree, collars revolubly mounted upon the swingletree and extending over the ends of the arms to hold the latter in their normal positions, said collars having notches therein and being movable to bring their notches into position for the passage of the ends of the arms therethrough, eyes carried by the collars, spring-rods secured at one end to the swingletree and engaged at the other ends in the eyes, said rods being arranged to hold collars yieldably with their notches out of position for the passage of the ends of the arms therethrough, fingers carried by the collars and extending outwardly therefrom and cables secured to the fingers, said cables being adapted to be pulled to move the collars against the action of the spring-rods.

In testimony whereof I affix my signature in presence of two witnesses.

JAIM B. S. P. TWAHA.

Witnesses:
JAMES B. GRAY,
M. J. CAMPBELL.